United States Patent [19]

Malakian et al.

[11] 4,227,101
[45] Oct. 7, 1980

[54] STEPPER MOTOR AND ADAPTOR RING

[75] Inventors: Vahe H. Malakian; Howard F. Hendricks, both of Lansdale, Pa.

[73] Assignee: Transicoil, Inc., Worcester, Pa.

[21] Appl. No.: 912,634

[22] Filed: Jun. 5, 1978

[51] Int. Cl.² .................................... H02K 37/00
[52] U.S. Cl. .......................... 310/49 R; 310/190; 310/89
[58] Field of Search ............... 310/190–193, 310/49, 162–165, 89, 910; 248/666, 664

[56] References Cited

U.S. PATENT DOCUMENTS

| 2,303,285 | 11/1942 | Kollsman | 310/49 |
| 2,571,810 | 10/1951 | Andresen, Jr. | 310/49 |
| 2,830,247 | 4/1958 | Thomas | 318/254 |
| 2,925,740 | 2/1960 | Chung | 74/242.13 |
| 3,330,976 | 7/1967 | Brown | 310/191 |
| 3,432,705 | 3/1969 | Lindtveit | 310/91 |
| 3,580,367 | 5/1971 | McCarthy | 248/14 X |
| 3,735,165 | 5/1973 | Touchman et al. | 310/49 |
| 3,787,014 | 1/1974 | Story et al. | 248/14 |
| 3,903,443 | 9/1975 | Carlson | 310/91 |
| 4,019,704 | 4/1977 | Levine | 248/16 |
| 4,138,617 | 2/1979 | Sudler | 310/49 |

Primary Examiner—Donovan F. Duggan
Attorney, Agent, or Firm—Seidel, Gonda, Goldhammer & Panitch

[57] ABSTRACT

A stepper motor is provided with an adaptor ring for establishing the desired detent position of the motor shaft. The adaptor ring is rotated to a desired mounting hole alignment with respect to the shaft and then the ring is permanently secured to the motor housing.

7 Claims, 3 Drawing Figures

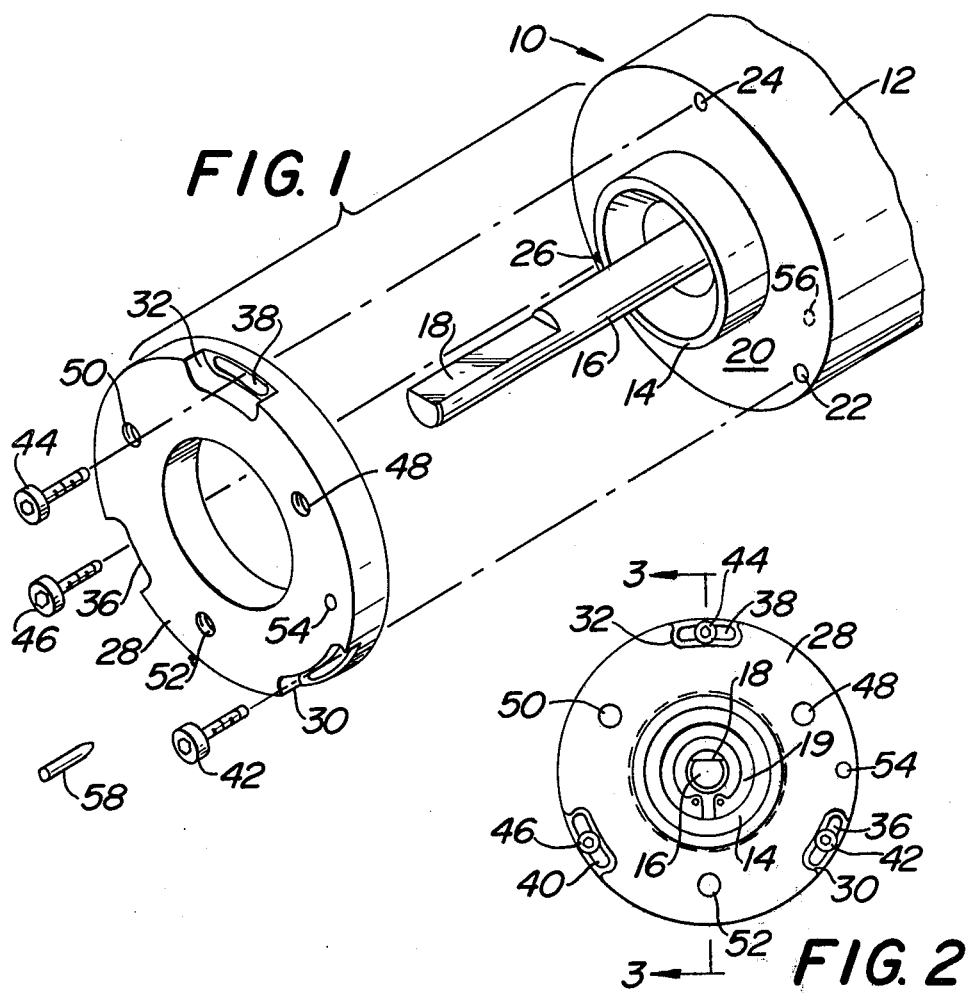
FIG. 1
FIG. 2
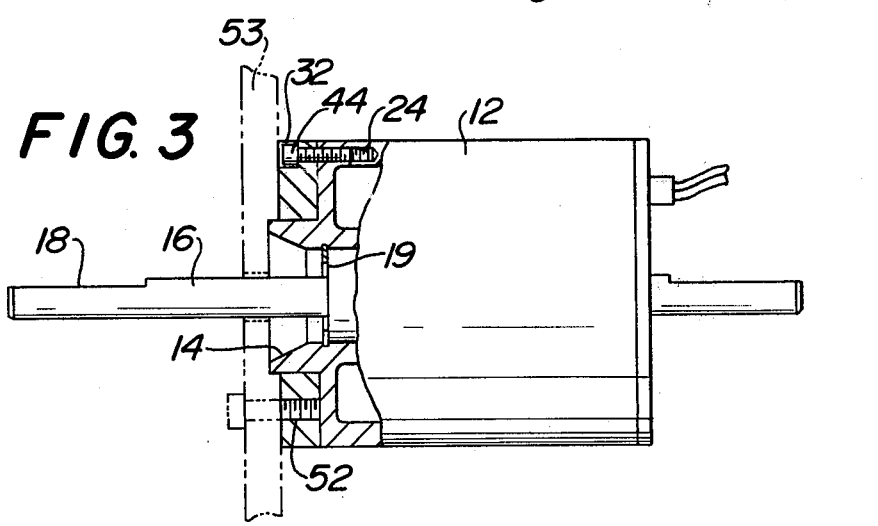
FIG. 3

STEPPER MOTOR AND ADAPTOR RING

BACKGROUND

As is well known, a stepper motor indexes from position to position rather than having a continuously rotating shaft. It is often necessary to mount the motor so that its housing is properly orientated to what is referred to as a detent position. The detent position is any one of several positions at which the shaft is momentarily stopped.

Heretofore, one technique involved a clamp ring around the outer periphery of the motor housing which was adjusted to the final position at the time of installation of the motor. This technique has the disadvantage of requiring excess mounting clearance around the motor housing, and additional assembly time is required to properly measure and locate the detent position of the shaft with the motor energized. Another technique that has been used is to grind a flat portion of the motor shaft after the motor has been installed. This is a difficult technique since it risks introducing chips and oil into the motor. Other techniques include attempting to adjust the detent position during assembly but this requires substantial skill and is time consuming.

The present invention is directed to a simple inexpensive solution to the problem.

SUMMARY OF THE INVENTION

In accordance with the present invention, a stepper motor in a motor housing has a shaft extending through an opening in the housing. The shaft has a flat thereon. An adaptor ring is provided at one end of the housing and coaxial with the opening through which the motor shaft extends. A means is provided for coupling the ring to said one end of the housing in a manner so that the ring has limited rotation relative to the housing. The ring has a plurality of mounting holes for selective coupling to a support. The ring also has a hole to facilitate permanent securement of the ring to the housing to prevent said relative rotation upon adjustment of the mounting holes to a detented position of the shaft.

It is an object of the present invention to provide a simple, inexpensive and reliable device for properly orientating a stepper motor housing to the detent position.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is an exploded perspective view of one end portion of a stepper motor and the adaptor ring associated therewith.

FIG. 2 is an end view of the stepper motor and adaptor ring.

FIG. 3 is a sectional view taken along the line 3—3 in FIG. 2.

Referring to the drawings in detail, wherein like numerals indicate like elements, there is shown in FIG. 1 a portion of a stepper motor designated generally as 10. The stepper motor 10 includes a housing 10 having an annular flange 14 at one end through which the motor shaft 16 extends. If desired, the motor 10 may have a double ended shaft whereby shaft 16 extends from opposite ends of the housing as shown in FIG. 3. Shaft 16 is provided with a flat portion 18 at the terminal end thereof.

The end face 20 of the housing 12 is provided with three equally spaced drilled holes 22, 24 and 26. An adaptor ring 28 is provided. Ring 28 has a bore which is telescoped over and rotatably supported by the flange 14. The axial thickness of ring 28 is approximately equal to or preferably slightly less than the axial length of the flange 14. The diameter of ring 28 is preferably equal to or slightly less than the diameter of housing 12. See FIG. 3.

The adaptor ring 28 on its exposed side face is provided with peripheral notches 30, 32 and 34 which are equally spaced from one another. The depth of the notches is approximately ½ the thickness of the ring 28. Within each of the notches, there is provided an arcuate slot. Thus, notch 30 is provided with slot 36; notch 32 is provided with slot 38; and notch 34 is provided with slot 40. In an exemplary embodiment, wherein the motor 10 has 24 steps per revolution so that the step angle is 15°; the slots have an arcuate extent of 20°.

A threaded fastener 42 extends through the slot 36 for threaded cooperation with the tapped hole 22. In a similar manner, fastener 44 extends through slot 38 for cooperation with hole 24 and fastener 46 extends through slot 40 for cooperation with hole 26. Since the fasteners extend through arcuate slots, the ring 28 is coupled to the motor housing 12 so as to provide for limited rotative adjustment.

The ring 28 is provided with three mounting holes designated 48, 50 and 52 which are equally spaced from one another and equally spaced from the recesses 30, 32 and 34. The holes 48, 50 and 52 are threaded and are adapted to receive mounting bolts for mounting the motor to a support designated 53 and shown in phantom in FIG. 3. The ring 28 is provided with a securement hole 54 in any convenient location. As illustrated in FIG. 2, hole 54 is between recess 30 and hole 48.

Positioning is accomplished in the following manner. Motor 10 is assembled with ring 28 telescoped over the flange 14. The fasteners 42, 44 and 46 are hand tight. Since the exemplary embodiment of the present invention has 24 detent positions spaced 15° apart, the shaft can be fully stopped at one of said detent positions by fixed direct current energization of selected conductors. Thereafter, the fasteners 42, 44 and 46 are loosened and ring 28 is rotated until one of the mounting holes 48, 50 and 52 has its axis at an angle of 45° (tolerance of ±2°) with respect to the flat 18. As shown in FIG. 2, the particular mounting hole having that relationship is hole 50.

Thereafter, the fasteners 42, 44 and 46 are secured tight. A drill bit is extended through hole 54 and a hole 56 is drilled into the end face 20 of the housing 12. A pin 58 is then permanently installed in the holes 54, 56 to permanently secure the ring 28 to the housing 12 and prevent a further relative rotation therebetween. As will be apparent from FIG. 3, the depth of the recesses 30, 32 and 34 is sufficient to accommodate the heads of the fasteners 42, 44, and 46 respectively so as to provide a uninterrupted exposed face on the ring 28.

The exemplary embodiment involves a stepper motor 10 which is a 4 phase, 8 pole motor having 24 steps per revolution with a step angle of 15°. The present invention is adaptable for use with other stepper motors and it will be apparent to those skilled in the art that an appropriate adjustment on angles and locations of the various holes and slots on the basis of simple computations.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus comprising:
   (a) a stepper motor including a housing, said motor having a shaft extending through an opening in said housing, said shaft having a flat on an exposed portion thereof,
   (b) an adapter ring coaxial with said housing opening and through which the motor shaft extends, means coupling said ring to one end of said housing in a manner so that ring has limited rotation relative to said housing, said ring having a plurality of mounting holes for selective coupling of said ring and housing to a support, and said ring having a hole to facilitate permanent securement of the ring to the housing to prevent said relative rotation whereby said ring may be secured to said housing upon adjustment of the mounting holes to a detented position to said flat on said shaft.

2. Apparatus in accordance with claim 1 wherein said ring has a diameter not greater than the diameter of said motor housing, said motor housing having an annular flange telescoped with respect to the bore of said ring.

3. Apparatus in accordance with claim 1 wherein said means facilitating limited relative rotation of said ring and housing includes arcuate slots on said ring, said slots being equally spaced from one another, and a threaded fastener for each slot, said motor housing having a discrete threaded hole for receiving each threaded fastener.

4. Apparatus in accordance with claim 3 wherein said ring has a plurality of recesses corresponding in number to said slots, each slot being within one of said recesses, the depth of the recesses being sufficient to accommodate the heads of said threaded fasteners extending through said slots, said recesses being at the peripheral portion of said ring.

5. Apparatus in accordance with claim 1 wherein the axis of one of said mounting holes is at an acute angle with respect to said flat in said detented position of said shaft.

6. Apparatus comprising:
   (a) a stepper motor including a housing, said motor having a shaft extending through an opening in said housing, said shaft having a flat on an exposed portion thereof,
   (b) an adaptor ring coaxial with said housing opening and through which the motor shaft extends, means coupling said ring to one end of said housing in a manner so that ring has limited rotation relative to said housing including arcuate slots on said ring, said slots being equally spaced from one another, and a threaded fastener for each slot, said motor housing having a discrete threaded hole for receiving each threaded fastener, said ring having a plurality of mounting holes for selective coupling to a support, and said ring having a hole to facilitate permanent securement of the ring to the housing to prevent said relative rotation upon adjustment of one of the mounting holes to a detented position of said flat on said shaft wherein said one hole is at a predetermined acute angle with respect to said flat.

7. A method comprising:
   (a) adjustably attaching an adaptor ring to a stepper motor housing,
   (b) energizing said motor so that the motor and stator electrically lock up to thereby define a detented position,
   (c) arcuately adjusting said ring relative to said housing to position a mounting hole in said ring to a predetermined acute angle relative to a flat on the motor shaft,
   (d) then fixedly securing said ring to said housing whereby said motor housing is orientated with respect to the detented position of said shaft.

* * * * *